US006961501B2

(12) United States Patent
Matsuura et al.

(10) Patent No.: US 6,961,501 B2
(45) Date of Patent: Nov. 1, 2005

(54) CONFIGURABLE PHOTONIC DEVICE

(76) Inventors: Naomi Matsuura, 12 Ulster Street, Apartment 7, Toronto, Ontario (CA) M5S 1E2; Harry E. Ruda, 21 Brookfield Road, Toronto, Ontario (CA) M2P 1B1; Ben G. Yacobi, 1700 The Collegeway, Mississauga, Ontario (CA) L5L 4M2

( * ) Notice: Subject to any disclaimer, the term of this patent is extended or adjusted under 35 U.S.C. 154(b) by 282 days.

(21) Appl. No.: 09/918,398

(22) Filed: Jul. 31, 2001

(65) Prior Publication Data

Related U.S. Application Data

(60) Provisional application No. 60/222,481, filed on Jul. 31, 2000.

(51) Int. Cl.[7] .............................. G02B 6/10; G02B 6/26
(52) U.S. Cl. ........................... 385/129; 385/4; 385/15; 385/37; 385/39
(58) Field of Search ............................. 385/14–24, 31, 385/37, 129–132, 1–10, 39

(56) References Cited

U.S. PATENT DOCUMENTS

| | | | |
|---|---|---|---|
| 5,385,114 A * | 1/1995 | Milstein et al. ................ | 117/1 |
| 5,541,614 A | 7/1996 | Lam et al. | |
| 5,688,318 A | 11/1997 | Milstein et al. | |
| 5,973,823 A | 10/1999 | Koops et al. | |
| 6,058,127 A | 5/2000 | Joannopoulos et al. | |
| 6,064,506 A | 5/2000 | Koops | |
| 6,091,067 A | 7/2000 | Drobot et al. | |
| 6,205,266 B1 | 3/2001 | Palen et al. | |
| 6,274,293 B1 * | 8/2001 | Gupta et al. ................ | 430/315 |
| 6,278,105 B1 * | 8/2001 | Mattia ...................... | 250/214.1 |
| 6,498,886 B1 * | 12/2002 | Sobiski et al. .............. | 385/122 |
| 6,512,866 B1 * | 1/2003 | Fan et al. ..................... | 385/27 |
| 6,711,200 B1 * | 3/2004 | Scherer et al. ............... | 372/64 |
| 2002/0048422 A1 * | 4/2002 | Cotteverte et al. ............ | 385/4 |
| 2002/0167984 A1 * | 11/2002 | Scherer ...................... | 372/50 |

FOREIGN PATENT DOCUMENTS

| | | |
|---|---|---|
| EP | 0 932 066 A1 | 7/1999 |
| JP | 2000111816 | 4/2000 |
| JP | 2001330793 | 11/2001 |

OTHER PUBLICATIONS

A Dictionary of Physics, 1996, Oxford University Press, third edition, p. pp. 119, 120 and 229.*
Joannopoulos, "The Almost Magical World of Photonic Crystals", Nov. 8-11, 1999, Lasers and Electro-Optics Society 199 12th Annual Meeting, LEOS '99 IEEE, vol. 1, pp. 232-233.*
Lourtioz et al., "Toward Controllable Photonic Crystals for Centimeter- and Millimeter- Wave Devices", Nov. 1999, Journa of Lightwave Technology, vol. 17, No. 11, pp. 2025-2031.*
Shanhui Fan, P.R. Villeneuve, J.D. Joannopoulos, Channel Drop Filters in Photonic Crystals, Jul. 6, 1998/vol. 3, No. 1/Optics Express pp. 4-11.

(Continued)

*Primary Examiner*—Michelle R. Connelly-Cushwa
(74) *Attorney, Agent, or Firm*—Bereskin & Parr

(57) ABSTRACT

A photonic crystal, and a photonic device having such a photonic crystal, configured by changing its physical geometry in at least one region to alter light propagation and/or confinement. The configuring means may include electrostrictive, piezoelectric or magnetostrictive components of the photonic crystal, or an actuation device affixed to the photonic crystal.

27 Claims, 12 Drawing Sheets

OTHER PUBLICATIONS

S. Enoch, G. Tayeb, D. Maystre, Numerical Evidence of Ultrarefractive Optics in Photonic Cyrstals, Mar. 15, 1999 Optics Communications 161 (1999) pp. 171-176.

S.G. Johnson, C. Manolatou, S. Fan, P. R. Villeneuve, J.D. Joannopoulos, H. A. Haus, Elimination of Cross Talk in Waveguide Intersections, Dec. 1, 1998/vol. 23, No. 23/ Optics Letters pp. 1855-1857.

C. C. Cheng, A. Scherer, V. Arbet-Engels, E. Yablonovitch, Lithographic Band Gap Tuning in Photonic Band Gap Crystals, Nov./Dec., 1996 J. Vac. Sci. Technol. vol. 14, No. 6, pp. 4110-4114.

A. Yariv, Y. Xu, R. K. Lee, A. Scherer, Coupled-Resonator Optical Waveguide: A Proposal and Analysis Jun. 1, 1999 / vol. 24, No. 11 / Optics Letters pp. 711-713.

P. R. Villeneuve, S. Fan, A Mekis, J.D. Joannopoulos, Photonic Crystals and their Potential Applications, Dec. 5, 1996, pp. 1-7.

* cited by examiner

CONFIGURABLE PHOTONIC DEVICE

This is an application claiming the benefit under 35 USC 119(e) of U.S. Provisional Application Ser. No. 60/222,481, filed Jul. 31, 2000. All of U.S. 60/222,481 is incorporated herein by this reference to it.

FIELD OF THE INVENTION

This invention relates generally to photonic devices, and more particularly to man-made photonic crystals suitable for use in controlling light propagation in photonic devices.

BACKGROUND OF THE INVENTION

Photonic crystals are periodic, dielectric, composite structures in which the interfaces between the dielectric media behave as scattering centres for light. Photonic crystals consist of at least two component materials (one of which may be air) having different refractive indices. The materials are arranged alternatingly in a periodic manner that is scaled so as to interfere with the propagation of light in a particular wavelength range. Light is scattered at the interfaces between the materials due to differences in the refractive index (or refractive index contrast) of the two materials. The periodic arrangement of the scattering interfaces prevents light with wavelengths comparable to the periodicity dimension of the photonic crystal from propagating through the structure. The band of blocked or forbidden wavelengths is commonly referred to as a photonic bandgap.

Practical applications for photonic crystals generally require man-made structures. Photonic devices are designed primarily for light frequencies ranging from the ultraviolet to the microwave regime (corresponding to wavelengths from 10 nanometers to 10 centimeters, respectively). Photonic crystals having these corresponding periodicities are not readily available in nature.

The simplest photonic crystal structure is a multilayer stack, consisting of alternating layers of dielectric materials with different refractive indices. The period of the structure (or unit cell dimension) is the combined thickness of a single layer of each of the dielectric materials. Such structures offer periodic refractive index contrast in one direction only and are known as one dimensional (1D) photonic crystals.

A 1D photonic crystal theoretically can act as a perfect mirror (i.e., having 100% reflectivity) for light with wavelengths within its photonic bandgap, and incident normal to the multilayer surface. Such 1D photonic crystals can be used in a variety of optical devices, including dielectric mirrors and optical filters.

When the periodic refractive index contrast is extended to two (or three) directions, the structures are known as 2D (or 3D) photonic crystals. In 2D photonic crystals, light may be reflected from any angle incident in the plane of periodicity (within its photonic bandgap), while for 3D photonic crystals, light may be reflected from any angle of incidence (within its photonic bandgap) 3D photonic crystal structures exhibiting this property have full photonic bandgaps.

Practical applications of photonic crystals generally depend on intentionally introducing defects into the periodic structure so that the propagation and/or confinement of light with wavelengths that would otherwise be forbidden can occur, that is, through so-called defect states located within the photonic bandgap.

Defects are defined as regions of the photonic crystal having a different geometry (i.e., spacing and/or symmetry) and/or a different refractive index contrast from that of the general periodic structure. For example, in a photonic crystal comprised of a periodic array of air-holes within a dielectric sheet, a possible defect would include leaving an array position with the dielectric material intact and not having an air-hole at that location. Given appropriate characteristics of the dielectric sheet and lattice symmetry, an optical cavity in the vicinity of the defect can form, suitable for confining at least one mode of light.

As another example, in the case of an array of dielectric columns separated by airspaces, removal of a series of columns (in a line), would create a defect through which specific wavelengths of light otherwise forbidden would be able to propagate. By appropriately eliminating further columns, light may be directed to form all-optical circuits (i.e., so-called planar lightwave circuits). Such circuits benefit from extremely tight bend radii to furnish compact optical circuits.

It has been recognized that photonic crystals may also provide imperfect reflectivity (i.e., reflectivity less than unity) due to imperfections in the periodic structure, Such imperfections can act in a manner similar to defect states, but occur through inadvertence and often result from limitations in the fabrication process. Although fabrication techniques have improved, unintended imperfections continue to occur and no practical means has been proposed to remove or correct them.

Defect states in 1D, 2D, and 3D photonic crystals result in planar, linear, and point localization, respectively. Since the presence of defect states in photonic crystal structures can precisely control light propagation or confinement, the design of photonic crystal-based optical devices has been extensively explored. Practical applications of photonic crystals to date include waveguides, light cavities, high a filters, channel drop filters and mirrors.

There has recently also been great interest in exploring the use of photonic crystals for applications such as planar lightwave circuits, wavelength division multiplexing applications, optical switches, optical computing, tunable gates, interconnects, and so forth. In such applications, the defect state in the photonic crystal would have to be altered in a controlled fashion to create a tunable wavelength band that can propagate through or be confined in the device. The main limitation of traditional photonic crystals is that control over the propagation or confinement of light is determined and fixed by its physical structure, as the defect state is permanently fixed in the photonic crystal, Although fixed defects in photonic crystals offer an ability to control light propagation or confinement, once such defects are introduced, the propagation or confinement of light in the crystal is determined. Thus, discretionary switching of light, for example, or re-routing of optical signals, is not available with fixed defects in a photonic crystal.

In order to configure the propagation or confinement of light through a photons crystal, the main approach that has been investigated is the modulation of refractive index contrast, principally using an applied electric field, and the uniform adjustment of the arrangements of the dielectric elements in the whole photonic crystal.

For example, U.S. Pat. No. 6,058,127 (Joannopoulos et al) discloses a technique for refractive index contrast modulation by applying an electric field to the dielectric. However, known materials offer only low electro-optic coefficient values for applied electric fields below the breakdown limit, and thus yield only small changes in refractive index.

In U.S. Pat. No. 5,973,823 (Koops et al.) and U.S. Pat. No. 6,064,506 (Koops), the photonic crystal cavities were filled with a material adjustable by an electric field. In this case, the refractive index contrast between the two media is significantly lowered, limiting the possibility of obtaining a full photonic bandgap.

An example of adjusting the photonic crystal periodicity is through the use of temperature, pressure or field excitation to the photonic crystal as described in U.S. Pat. No. 5,688,318 (Milstein et al.), but the proposed method does not provide discretionary modification of selected elements of the photonic device. No control of the defect states is provided.

None of the previously disclosed approaches for tuning photonic crystals has been successful in practical applications because they either provide only negligible changes in the ability of the structures to guide or confine light, or they significantly reduce the size of the photonic band gap, or they produce only non-local changes that are not useful for re-routing or confining light in a discretionary fashion.

It is an object of the present invention therefore to obviate or mitigate the shortcomings of known photonic crystal structures, and particularly to provide photonic crystal structures through which it is possible to change the propagation and/or confinement of light in a discretionary fashion,

SUMMARY OF THE INVENTION

According to the present invention, there is provided a photonic crystal, and a photonic device comprising a photonic crystal, having configuring means for effecting a change to the physical geometry in at least one region of said photonic crystal such that the propagation of light therethrough or the confinement of light therein is thereby altered, or such that both the propagation and confinement of light are altered. The configuring means for effecting such a change may include an electrostrictive, piezoelectric or magnetostrictive component of the photonic crystal, or a microactuation device affixed to the photonic crystal.

It has surprisingly been found that such effected changes in the physical geometry of region(s) of a photonic crystal can be used to control propagation and confinement of light in a discretionary fashion. The invention therefore offers the advantage of the hitherto unavailable combination of precise control of light propagation or confinement, or both, with the ability to route light propagation in a discretionary fashion based on geometrical configuration in a region.

Preferably, the photonic device of the present invention comprises a photonic crystal and a support in which the physical geometry of the photonic device elements (photonic crystal units and its supports) can be reversibly or irreversibly changed in any given region, at particular times, or continuously at a chosen frequency.

Changes in physical geometry may include changes in the dimension of the photonic device elements and changes in their location, and may occur for a single element or a plurality of elements. Such changes may be accomplished by configuration of either the photonic crystal itself or its support (i.e., changing the physical geometry of the elements based on photonic crystal element configuration, or support configuration).

The photonic crystal configuration may occur based on its material properties, e.g., through the piezoelectric (or electrostrictive) effect or through actuator movement, e.g., a micro-actuation device, including so-called micro-electro-mechanical-systems (MEMS) technology.

Configuration of both the photonic crystal and its support may be accomplished using the intrinsic properties of a particular class of dielectric materials that exhibit the piezoelectric effect. The piezoelectric effect refers to the application of an electric field resulting in the physical dimensions of a given piezoelectric element (including the photonic crystal support) being changed in a predetermined manner. Selectively applying an electric field to one or more given piezoelectric elements (e.g., by using electrical contacts) of a photonic crystal and/or its support (i.e., in which the crystal and/or its support is composed of dielectric material exhibiting a piezoelectric response), will significantly deform (e.g., deflecting, elongating, compressing or otherwise) such elements leading to the selective introduction or removal of defects in the photonic crystal.

Such changes are significant in that they permit the propagation, confinement, or both of selected wavelengths and modes of light in the structure to be changed. Since changes in dimension are proportional to applied electric field for an appropriate choice of applied field, the allowed wavelength for propagating and/or confined light in the vicinity of the introduced defect may be changed or tuned continuously. Moreover, defects so created for light propagation or confinement may be opened and closed at a predetermined rate by applying an appropriate alternating electric field.

The present invention encompasses devices comprising photonic crystals having intentionally introduced defect states and devices comprising photonic crystals having no pre-existing intentional defects in their periodic structure.

Configuration also provides a mechanism for adaptively removing imperfections in a photonic crystal. For example, the imperfections characteristic of real structures may be compensated by using electric fields applied in a discretionary fashion to elements of the structure, throughout the structure. Also, this principle may be used to configure the photonic device by measuring the output signal(s) of the photonic device and applying input signal(s) to change the physical geometry of the device so as to provide for closed loop control. This approach, for example, can be used to improve yields in the fabrication of complex, integrated, light circuits. Such devices are also amenable to open loop control.

Configuration of the support or substrate allows a photonic crystal of arbitrary dielectric material to be selected. The advantage in this case is that the constraint of using a piezoelectric material is relaxed, and the opportunity to select materials with superior refractive index contrast is available. Using standard bonding technology, the photonic crystal can be mated to an array of actuators that change the geometry of the photonic crystal permitting defects to be introduced arbitrarily. MEMS technology is well suited for fabricating such arrays and readily offers the possibility of producing actuators capable of yielding displacements with sub-nanometer resolution.

In addition to the piezoelectric effect, other means of movement that may be used to configure the photonic element(s) include configuration due to a photonic element's interaction with electrostatic forces or pneumatic forces, and configuration due to the photonic element's intrinsic properties (e.g., electromagnetic effect, thermal effect, magnetostrictive effect, electrostrictive effect, or electro-thermal effect).

The invention permits heretofore unattainable control of light propagation, confinement, or both in a photonic crystal, allowing appreciable modulation of tho propagating light (in free space or otherwise), for any dimensionality (1D, 2D, and 3D photonic crystals), selectively in space and in time.

Propagation and confinement of light in a photonic device may include rectilinear propagation, reflection, refraction, focusing, dispersion, diffraction, interference, polarization, absorption, emission, and amplification. Also included are perturbation(s) of the photonic device by, for example, light and electric field, that alter the propagation and confinement characteristics of light in the photonic device such as, second-harmonic generation, frequency conversion, parametric amplification, parametric oscillation, third-harmonic generation, self-phase modulation, self-focusing, four-wave mixing, optical amplification, optical phase conjugation, optical solutions, and optical bistability.

The invention therefore entails (a) providing changes in dielectric properties by adjusting the periodicity of the dielectric in the photonic crystal, (b) affecting such changes in a given location of the photonic crystal, (c) being able to realize such changes in a discretionary fashion, and (d) being able to modulate as a function of time such changes, so as to render a modulation model for configuring the propagation of selected wavelengths of light in such photonic crystals, in both space and time.

The invention encompasses the configuring (or tuning) of a photonic crystal, in whole or in part, in space and in time, using photonic crystal element configuration, support element configuration, or both photonic crystal element configuration and support element configuration. Such configuring and re-configuring may be used to alter propagation direction or wavelength, affected in space or time, and may be applied to both existing defect states and perfectly periodic photonic crystal structures. The invention may also be used to compensate for an imperfect photonic crystal structure, and to tune signals confined within or propagating through the photonic device, with or without feedback for closed or open loop control.

BRIEF DESCRIPTION OF THE DRAWINGS

In order that the invention may be more clearly understood, reference will now be made to the following drawings in which.

DETAILED DESCRIPTION THE INVENTION

Figure 1:
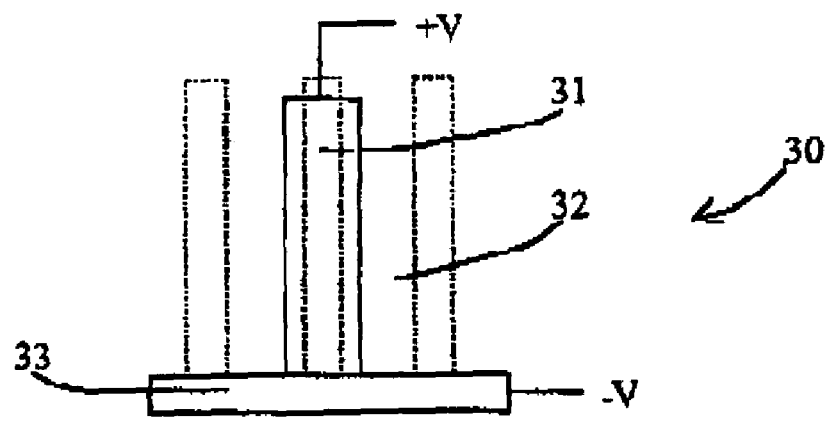
FIG. 1 is a schematic representation (elevation view) showing piezoelectric-induced elongation/compression of a photonic crystal element of the present invention.

A first preferred embodiment of the invention, in which the physical geometry of a photonic crystal may be configured due its intrinsic (or material) properties, is shown schematically in FIG. 1. The photonic device comprises a photonic crystal 30 which includes pillars of a piezoelectric material 31 separated by air 32 on a support 33. A voltage applied across the piezoelectric pillar 31 will configure the pillar such that the dimensions (size or shape) of the pillar will be changed (from the dotted line to the solid line). The resulting change in periodicity will alter the optical properties of the photonic crystal.

An advantage of configuration of the photonic device element by directly changing the geometry of the photonic crystal itself is that it leads directly to changes in the optical properties of the photonic device. The benefit of configuration of the photonic device element using the support is that there is no restriction on the selected photonic crystal that may be physically affixed to it.

The photonic crystal or the support may be configured using the well-known piezoelectric or electrostrictive effects. Piezoelectric materials have been used to permit transducer applications to be realized for almost forty years) and as thin film micro-sensors and micro-actuators for over a decade.

Several material classes are suitable for directly altering the physical geometry of the photonic device element. These include high refractive index piezoelectric and electrostrictive materials such as barium titanate and lead zirconate titanate, which typically have refractive indices greater than 2 in the visible to near-infrared wavelength range (e.g., n~2.4 for $BaTiO_3$ and n~2.6 for PZT/PLZT) in the former class, and lead magnesium niobate, PMN, (i.e,, n~2.5) in the latter class.

Application of an electric field on the configurable element(s) of a photonic device will cause the element to significantly deform (e.g., deflecting, elongating/compressing or otherwise) leading to the selective introduction and removal of defects in the photonic crystal. This deformation is caused by the application of an electric field, and may be in direct proportion to the applied field (i.e., for an appropriate intensity of applied electric field), allowing the defect to be tuned continuously. Defects may also be introduced or removed at a predetermined rate by applying an appropriate alternating electric field. In addition, this modulation model also provides a mechanism for adaptively perfecting a photonic crystal, by compensating for imperfections arising naturally from the nature of practical fabrication processes. That is, electric fields may be applied in a discretionary fashion to selected elements of the structure, throughout the structure, to compensate for the imperfections characteristic of real structures.

One example of how the electric field may be applied to the photonic crystal in this invention is through the use of a pre-patterned substrate as the bottom electrode and a metallized membrane serving as a continuous (i.e., sheet.) top electrode, Known lithographic techniques may be used to fabricate pre-patterned bottom electrodes on the substrate (typically chosen from glass or silicon). Suitable bottom electrode materials may include gold, platinum and conducting oxides (e.g., $RuO_2$), For optical applications, the pre-patterned area may range from several micrometers in size (e.g., for a switch) to several centimeters in size (e.g., for dense wavelength-division multiplexing, or DWDM, applications).

The advantages of using silicon-based substrates include the ability to micromachine v-grooves (i.e., MEMS technology) for aligning optical fibres and/or light sources with the photonic crystal. A piezoelectric film (e.g., PZT) may be deposited on top of the pre-patterned substrate using a thin film deposition process (e.g., sol-gel processing, sputtering, and MOCVD). A resist may be deposited on the piezoelectric thin film, patterned using known lithography to reveal apertures for etching. A suitable process for etching is dual frequency reactive ion etching, a standard commercial process.

In order to align the photonic crystal elements of the piezoelectric material, coarse alignment may be accomplished first by using the silicon wafer flats, and then by using backside infra-red alignment for fine adjustment. The size of the electrodes may be anywhere from about 50 nm up to about 1 mm scale, depending on the desired size of the photonic crystal elements (e.g., electron-beam or x-ray lithography is suitable for nanometer-scale lithography, while optical lithography is suitable for micrometer-scale lithography).

The top electrode may be made of a suitable flexible, conducting material (e.g., metal-coated membrane). The membrane may be coated with a thin (micrometer-scale) coating of metal (e.g., aluminum, gold, or a eutectic such as Al—Au or In—Sn), which may be bonded to the top of the photonic crystal. Bonding may be accomplished using localized heating (e.g., rapid thermal processing, or optical radiation from micromachined polysilicon resistor formed on the membrane). A electric field may be applied selectively to a single photonic crystal element or to groups of photonic crystal elements through the bottom contact while grounding the top contact, resulting in reconfiguration of the photonic crystal element(s).

It is also possible to use other types of piezoelectric elements, such as bimorphs, or other flex-tensional devices, Bimorph deflection results in very large displacements of the photonic crystal elements, depending on the height of the element (for example, proportional to $3(d_{31}(E(t^2/(2(D))$, where E is the field applied to the bimorph, t is the height of the element, and D is the thickness of the element).

Figure 2:
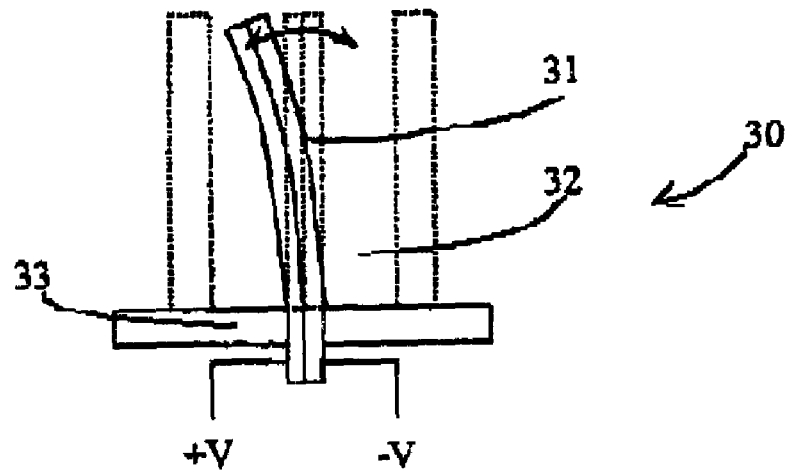
FIG. 2 is a schematic representation (elevation view) showing piezoelectric-induced bimorph deflection of a photonic crystal element of the present invention.

Turning to FIG. 2, another embodiment of the invention is shown in which the photonic crystal element(s) may be configured through bimorph deflection due its intrinsic (or material) properties. The photonic crystal 30 includes pillars of a piezoelectric material 31 separated by air 32 on a support 33. A voltage applied across the base of piezoelectric pillar 31 will configure the pillar such that the size and/or shape of the pillar will be changed (from the dotted line to the solid line). The resulting change in periodicity will alter the optical properties of the photonic crystal.

The photonic crystal may be indirectly configured through alternations of the physical geometry of the support. This may be accomplished using the intrinsic properties of the support (again, through an effect such as piezoelectricity) or using a form of actuator technology (e.g., MEMS). In this reconfiguration model, the photonic crystal may be of any suitable material, allowing the selection of a dielectric material with a high refractive index. Using standard bonding technology, the photonic crystal can be mated to an array of actuators that cause a local change in geometry of the photonic crystal, permitting defects to be introduced/removed arbitrarily. In addition to using substrates exhibiting the piezoelectric and electrostrictive effect, micro-electro-mechanical-systems (MEMS) may be used to mechanically configure the defects within the photonic crystal, The degree of dimensional change of the substrate depends on the actuation mechanism.

An advantage of using intrinsic properties to reconfigure the support is that the transducer material technology is well known to those skilled in the art, with many inexpensive, high piezoelectric coefficient piezoelectric/electrostrictive components commercially available (e.g. from Kistler instrument Corp.; TRS Ceramics, Inc.; Physik Instruments; APC International Ltd.). Also, transducer characteristics have been continually improving, with very large piezoelectric responses recently reported in the literature (for example, $d_{33}$~2,500 pC/N for PZT, Penn State Annual Report, 1998).

There are a very large number of piezoelectric/transducer materials, in the categories of crystals (e.g., rochelle salt, quartz, ammonium dihydrogen phosphate (ADP), potassium dihydrogen phosphate (KDP), tourmaline, zinc blende (ZnS), barium titanate ($BaTiO_3$), lithium niobate ($LiNbO_3$), lithium tantalate, bismuth germanium oxide), ceramics (e.g., lead titanate ($PbTiO_3$), lead zirconate ($PbZrO_3$), lead metaniobate ($PbNb_2O_6$), load zirconate titanate ($Pb(Zr_1Ti)O_3$), barium titanate ($BaTiO_3$)), polymers (e.g., polymer polyvinylidene fluoride (PVDF), polyvinylidene fluoride-trifluoroethylene ($VF_2$–$VF_3$)), composites, magnetostrictive alloys (e.g., terbium dysprosium iron($Tb_{0.3}Dy_{0.7}Fe_{1.93}$), terbium dysprosium ($Tb_{0.6}Dy_{0.4}$)), and electrostrictive ceramics (e.g., lead magnesium niobate-lead titanate (PMN-PT)).

Very large strains have been observed—for example, piezoelectric PZN:PT with strains of 1.7%, and electrostrictive PVDF:TrFe copolymers with strains of 4% (Penn State Annual Report), enough to cause significant changes in the optical properties of the photonic crystal.

To exemplify the magnitude of change in periodicity required to cause significant changes in the optical properties of a 3D photonic crystal, changes in periodicity of 5% result in the transmission spectrum peak intensity being displaced by 150 nm (C. C. Cheng, A. Scherer, V. Arbet-Engels, and E. Yablonovitch, "Lithographic Bandgap tuning in photonic Bandgap cystals", J. Vac. Sci. Technol. B, Vol. 14, No. 6, 1996, 4110–4114), or in the case of a 2D photonic crystal, a shift of 40 nm (Hideki Masuda, Masayuki Ohya, Hidetaka Asoh, Masashi Nakao, Masaya Nohtomi, and Toshiaki Tamamura, "Photonic Crystal using anodic porous alumina", Japan Journal of Applied Physics, Part 2, Vol. 38, No. 12A, 1999, L1403–1405).

In Dense Wavelength-Division Multiplexing/Demultiplexing (DWDM) systems, common channel spacings for DWDM are 100 GHz (corresponding to a channel spacing of ~0.8 nm at 1550 nm) or lower frequencies (for example, 50 or 25 GHz), providing approximately 50 channels in the C-band (1525 to 1570 nm). Piezoelectric materials are suitable for "scanning" a photonic crystal response over the complete wavelength band, using small induced changes in local periodicity for channel-to-channel modulation, over the relatively large range of the DWDM wavelength range.

The absolute degree of movement of a given photonic crystal element depends on the piezoelectric coefficient, the size of the element, the voltage applied, and the movement mechanism. Under appropriate conditions, these large piezoelectric coefficients permit significant changes in the periodicity of photonic crystals to be realized.

Figure 3:
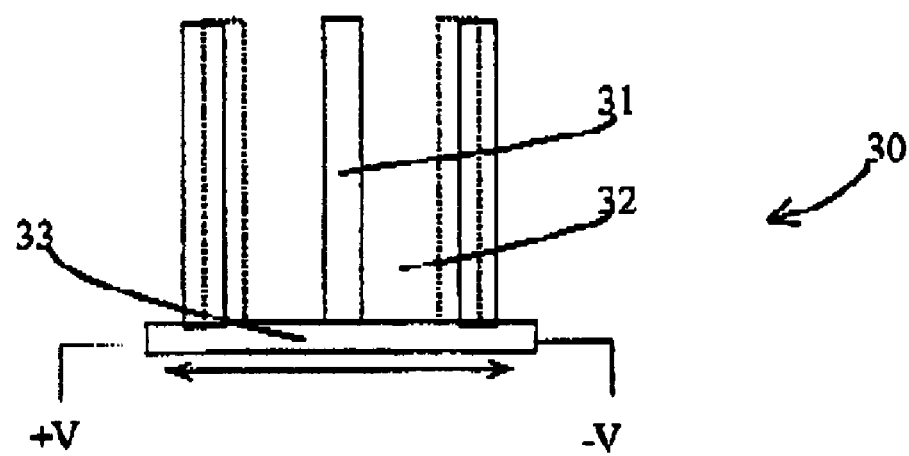
FIG. 3 is a schematic representation (elevation view) showing piezoelectric-induced elongation/compression of the support of the present invention.

In FIG. 3, another embodiment of the invention is shown in which the support may be configured through elongation/compression due its intrinsic (or material) properties. The photonic device includes pillars of a first dielectric 31 separated by air 32 on a support 33. A voltage applied across the base of the support 33 will change the separation between the pillars (from the dotted line to the solid line). The resulting change in periodicity will change the optical properties of the photonic crystal.

Traditional actuators typically take many different forms—some common examples include discs, rings, washers, cylinders, tubes, bars, plates and hemispheres. More elaborate flex-tensional devices (e.g., bimorphs) and stacked piezoelectric elements are used to achieve increased displacements as compared with conventional piezoelectric elements. In addition, piezoelectric motors have been developed to add to the range of piezoelectric actuators (e.g., inchworm motors and standing wave motors).

Figure 4:
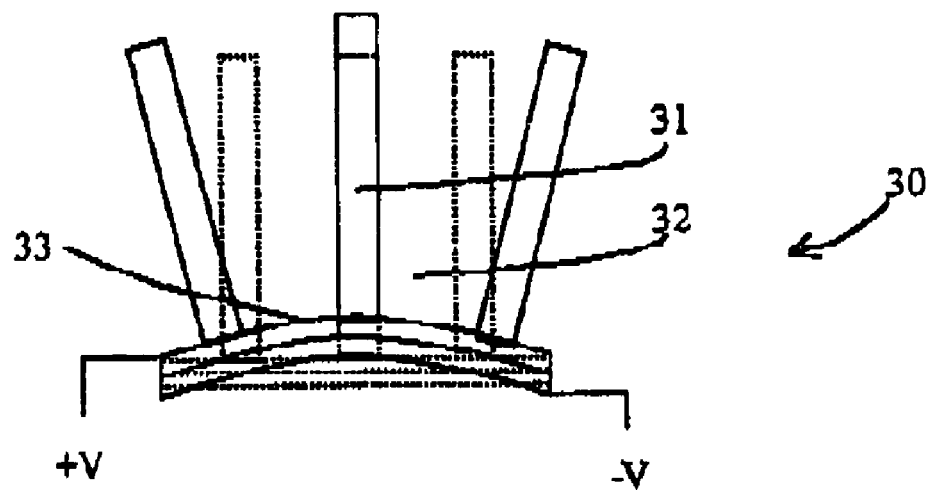
FIG. 4 is a schematic representation (elevation view) showing piezoelectric-induced bimorph deflection of the support of the present invention.

In FIG. 4, another embodiment of the invention is shown in which the support may be configured through bimorph deflection due to its intrinsic (or material) properties. The photonic crystal 30 includes pillars of a first dielectric 31 separated by air 32 on a support 33. A voltage applied across the base of the support 33 will reconfigure the pillar such that the separation between the pillars will be changed (from the dotted line to the solid line). The resulting change in periodicity will change the optical properties of the photonic crystal.

In addition to intrinsic (or material) properties of the support, the movement of the support may be accomplished using extrinsic methods (e.g., a micro-actuation device, including so-called micro-electro-mechanical-systems (MEMS) technology). MEMS technology is a mature technology, well suited for fabricating such arrays and readily offering the possibility of producing actuators capable of yielding displacements with sub-nanometer resolution.

Using the substrate configuration method, it is possible to create a wide range of different displacement configurations, particularly using the microactuator embodiment. Microactuation devices work on a large number of operating principles (e.g., photothermal, electrostrictive, electrostatic, electromagnetic, thermal, magnetostrictive, electro-thermal, pneumatic, stress, etc.) resulting in different magnitudes of displacement. However, the micro-actuators all result in configuration of the substrate, regardless of operating principle.

Figure 5:
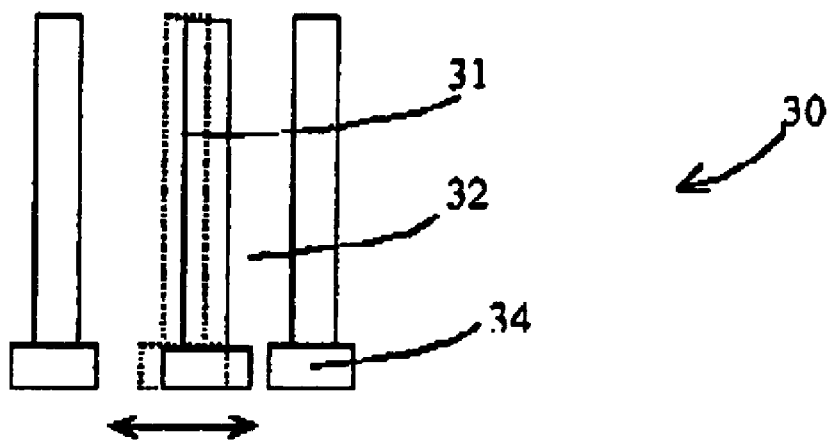
FIG. 5 is a schematic representation (elevation view) showing microactuator-based lateral translation of a photonic crystal element of the present invention.
Figure 6:
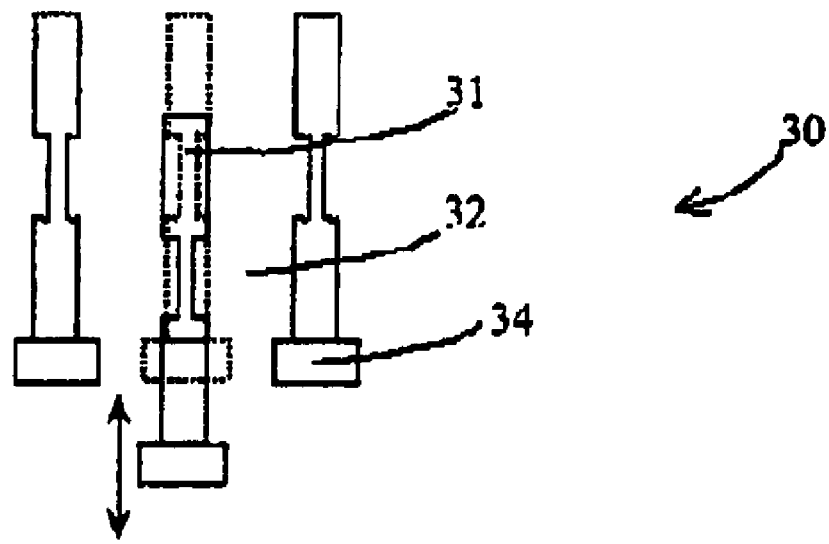
FIG. 6 is a schematic representation (elevation view) showing microactuator-based vertical translation of a photonic crystal element of the present invention.
Figure 7:
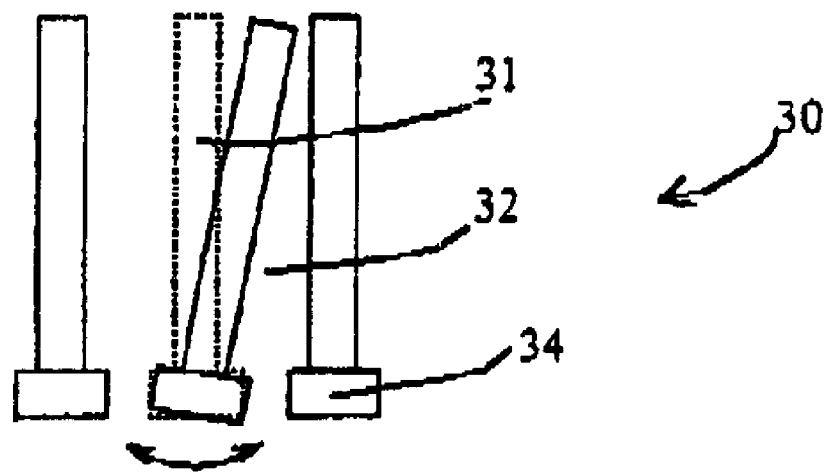
FIG. 7 is a schematic representation (elevation view) showing microactuator-based rotation/displacement of a photonic crystal element of the present invention.
Figure 8:
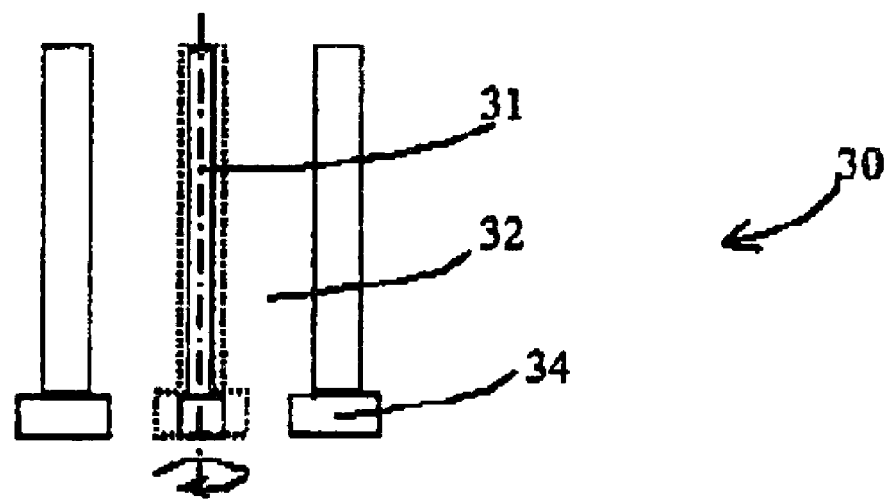
FIG. 8 is a schematic representation (elevation view) showing microactuator-based rotation of a photonic crystal element of the present invention.
Figure 9:
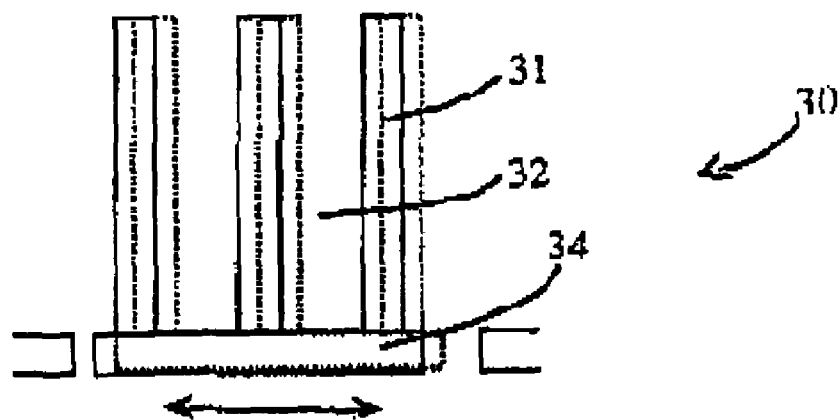
FIG. 9 is a schematic representation (elevation view) showing microactuator-based lateral translation of a group of photonic crystal elements of the present invention.
Figure 10:
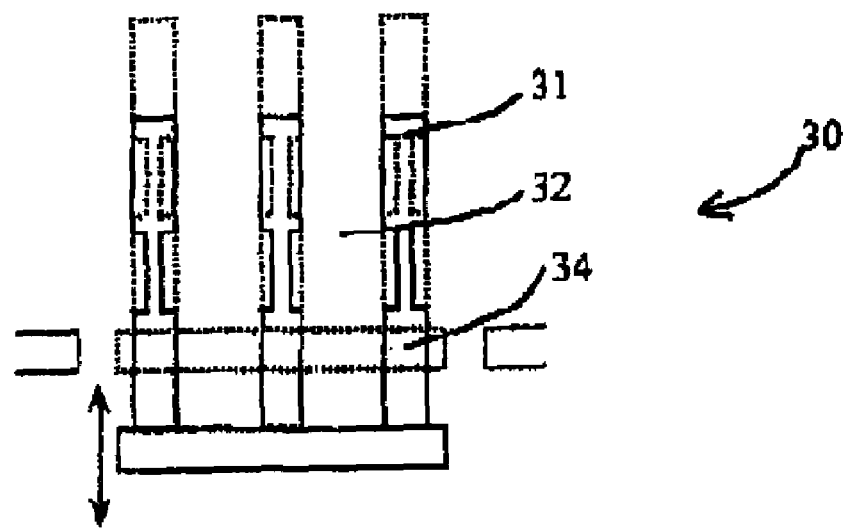
FIG. 10 is a schematic representation (elevation view) showing microactuator-based vertical translation of a group of photonic crystal elements of the present invention.
Figure 11:
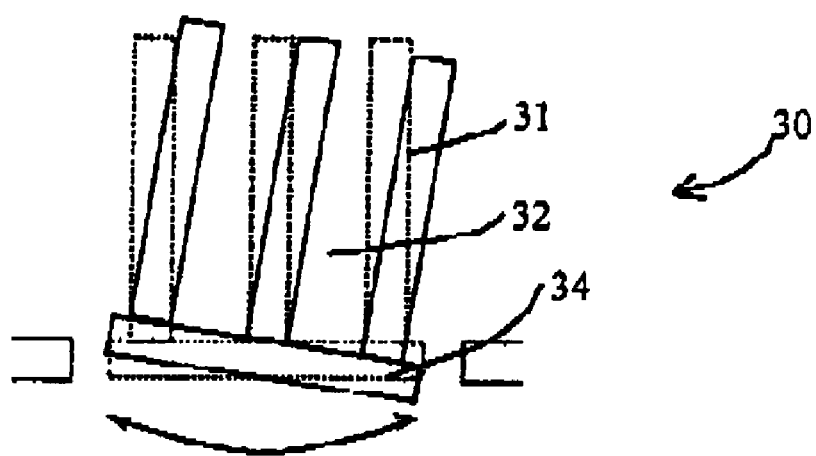
FIG. 11 is a schematic representation (elevation view) showing microactuator-based rotation/displacement of a group of photonic crystal elements of the present invention.
Figure 12:
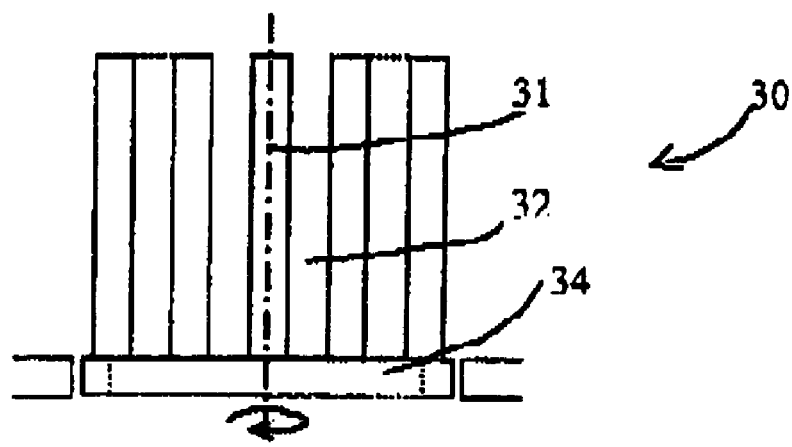
FIG. 12 is a schematic representation (elevation view) showing microactuator-based rotation of a group of photonic crystal elements of the present invention.

FIGS. 5 to 12 represent schematic elevation views of 2D photonic devices showing alternate embodiments of the invention in which the support may be configured through the microactuator embodiment (where the dotted and solid lines represent the changes between the original and configured state). The photonic devices include pillars of a first dielectric 31 separated by air 32 on a support/actuator 34. Translation of an element in the horizontal direction allows the periodicity of the photonic crystal to be altered as shown in FIG. 5, while translation of a textured photonic crystal element (for example, a notched element) in the vertical direction creates a change in fill factor as shown in FIG. 6. Rotation of the photonic crystal element may occur relative to unactuated elements as in FIG. 7, or about its centre for an asymmetrical photonic crystal element as in FIG. 8.

This support configuration method may be applied to a significant portion of the photonic crystal (as well as to a single element as described above). It is possible to use the microactuator configuration method to translate and/or rotate a group of photonic crystal elements as shown in FIGS. 9 to 12. In particular, it is possible to rotate a group of elements about its centre to change its local fill factor (FIG. 12), allowing pre-existing defect states to be rotated relative to defect states on another group of photonic crystal elements.

Figure 13:
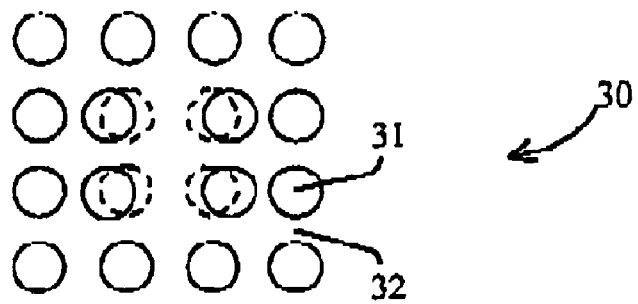
FIG. 13 is a schematic representation (plan view) showing the movement of a photonic crystal element of the present invention.
Figure 14:
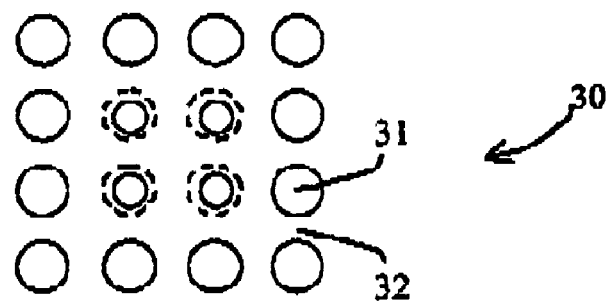
FIG. 14 is a schematic representation (plan view) showing the change in size of a photonic crystal element of the present invention.
Figure 15:
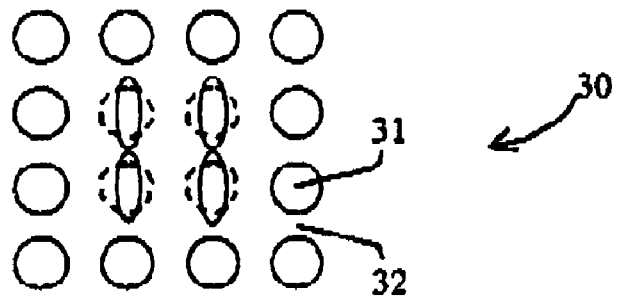
FIG. 15 is a schematic representation (plan view) showing the change in shape of a photonic crystal element of the present invention.

FIGS. 13 to 15 are schematic plan views of 2D photonic devices representing possible configuration mechanisms of the present invention, where the original state of the dielectric pillars 31 surrounded by air 32 is represented by the dotted line and the configured state is represented by the solid line. The photonic crystal elements may move relative to each other (i.e., local change in structure symmetry and/or periodicity) due to configuration of the photonic crystal or its support (FIG. 13), the photonic crystal elements may change in size (i.e., local change in fill factor and/or periodicity) due to configuration of the photonic crystal or its support (FIG. 14), or the photonic crystal elements may change in shape due to configuration of the photonic crystal or its support (FIG. 15).

The configuration mechanisms of the present invention may be used to change the direction(s) or electromagnetic field pattern(s) of a fixed frequency (or frequencies) of light passing through the photonic crystal, change the frequency of light passing through the photonic crystal, change both the direction and frequency of light passing through the photonic crystal, or any combination thereof, and additionally to compensate for imperfections in photonic crystals.

Photonic crystal cavities represent high quality factor (Q) cavities owing to the high effective reflectivity of the cavity in the range of the photonic bandgap. A photonic cavity can support at least one mode of light depending on the cavity dimensions, The mode characteristics are defined by the cavity dimensions (i.e., shape and size) and the dielectric properties of the surrounding photonic crystal medium. Those characteristics include the mode energy distribution within the cavity as well as that penetrating into the cladding, mode symmetry, and mode polarization, in both the steady-state and in time.

The higher the Q value of the cavity, the narrower the frequency dispersion for a given mode. For a cavity that supports a plurality of modes, the inter-mode frequency spacing or free spectral range, is functionally dependent on the cavity dimensions. By changing the dimensions of the cavity, the allowed frequencies, mode symmetries, polarization(s), intensity distribution(s), full-width half-maximum spectral distribution, and free spectral range, can all be tuned.

For example, DWDM systems are anticipated to operate with channel spacing as narrow as 6.25 GHz, and such high Q cavities are feasible for such systems. In such systems, photonic crystal cavities may be made proximate to each other such that tunneling of light mode(s) between said cavities occurs, providing resonantly coupled optical cavities. Examples of such coupled photonic crystal cavity systems include coupled resonant optical waveguides (Amnon Yariv, Yong Xu, Reginald K. Lee and Axel Scherer, "Coupled-resonator Optical Waveguide; a Proposal and Analysis", Optics Letters, Vol. 24, No. 11, 1999, 711–713) and compound systems including photonic crystal cavities coupled to photonic crystal waveguides (Steven G. Johnson, Christina Manolatou, Shanhui fan, R. Villeneuve, J. D. Joannopoulos, H. A. Haus, "Elimination of cross talk in waveguide intersections", Optics Letters, Vol. 23, 1998, 1855–1857).

Furthermore, in addition to providing a means for tuning the properties of the photonic crystal cavity, the mechanism also allows the relative location of the cavity with respect to other photonic crystal and conventional photonic components to be adjusted. This permits a configurable means for controlling light propagation, confinement, or both in an optical integrated circuit. Surprisingly, this approach can be used to control the intensity of light confined within, or propagating through the photonic device. Moreover, this can be used to equalize the intensity of individual signals within a band.

Two applications for the invention that can benefit from the ability to change the direction of the light frequency passing through the structure for a specific mode in the photonic bandgap are configurable waveguides and configurable spatial light modulators (i.e., for free-space optical interconnects).

Figure 16:
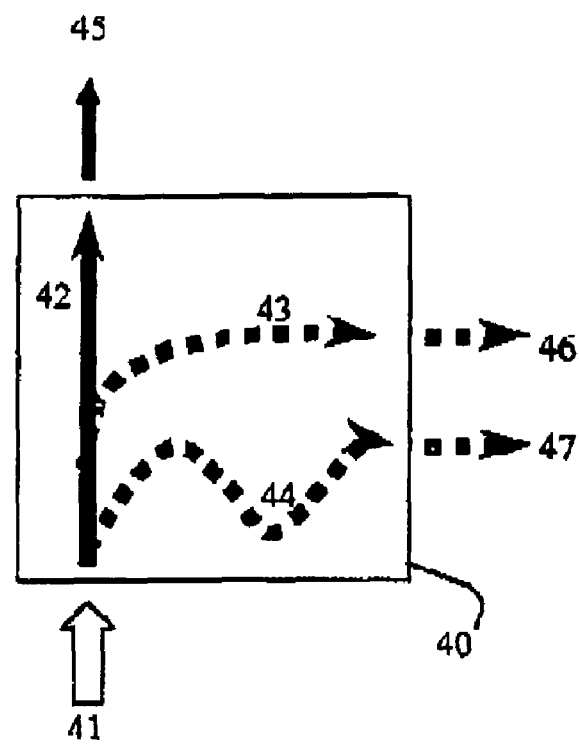
FIG. 16 is a schematic representation (plan view) showing a configurable waveguide as an example of an embodiment of the present invention.

Waveguides are useful embodiments of photonic crystals as it is possible to guide light efficiently around tight corners (90° bends) with radii of curvature on the order of the wavelength of the guided light in photonic crystals, (P. R. Villeneuve, S. Fan, A Mekis, and J. D. Joannopoulos, "Photonic Crystals and their potential applications", IEE Colloquium on Semiconductor Optical Microcavity Devices and Photonic Bandgaps, IEE, London, UK; 1996, 1–7). FIG. 16 is a plan view schematic representation of a configurable waveguide as an example of an embodiment of the present invention. Light at a frequency within the photonic bandgap 41 is incident on the photonic crystal 40. It is feasible to introduce a defect state 42 in the photonic crystal 40 that lies within the photonic crystal bandgap, and then spatially reconfigure this defect with time to create an alternate light path through the photonic crystal (42 or 43). Light may exit the photonic crystal in a chosen location (45, 46, or 47) corresponding to the position of the reconfigured defect states.

Figure 17:
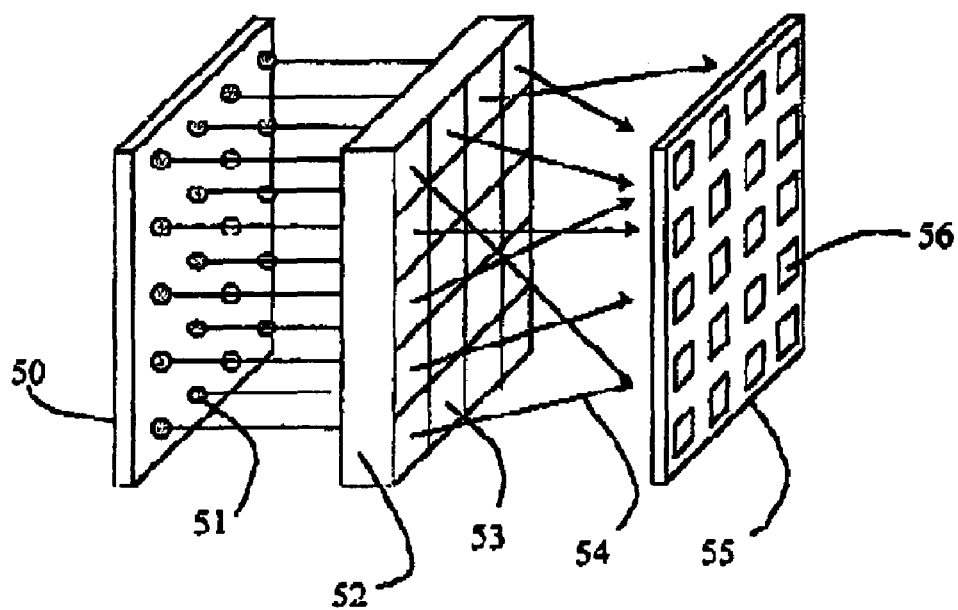
FIG. 17 is a three-dimensional schematic representation showing a configurable spatial light modulator as an example of an embodiment of the present invention.

This embodiment may be constructed, for example, using a 2D photonic crystal made of dielectric rods on a square lattice with unit cell size "a", refractive index contrast of 3.4, and dielectric rods of radius of 0.18 a, which was found to have a TM photonic bandgap at wavelengths from 2.257a to 3.322a (P. R. Villeneuve, S. Fan, A Mekis, and J. D. Joannopoulos, "Photonic Crystals and their potential applications", IEE Colloquium on Semiconductor Optical Microcavity Devices and Photonic Bandgaps, IEE, London, UK; 1996, 1–7). It is possible to use the MEMS configuration shown in FIG. 6, for example, to remove a row of rods to cause light to propagate within the photonic bandgap in a selected defect state. In accordance with the invention, light may be routed to a path anywhere in the photons crystal, by selectively introducing the defect to route light in a selected spatial direction, This same principle may be adopted to form a configurable spatial light modulator that can be used to relieve the existing interconnect bottleneck in the backplane of microelectronic chips. FIG. 17 is a three-dimensional schematic representation showing a configurable spatial light modulator as an example of an embodiment of the present invention. The light emitter array 50 composed of light emitting diodes 51, (or laser diodes, or superluminescent diodes, or vertical cavity surface emitting lasers (VCSEL)) emits light on the configurable spatial light modulator 52, which directs light to the detector array 55 (e.g. multiple quantum well (MQW) detector arrays). Using "free-space optics", which can make use of a whole surface of a chip 50 for connections (i.e., three-dimensional computing with free-space optical interconnects instead of wires), light signals from an array of light emitting diodes 51 may be used to transmit information in free space perpendicular to the chip surface (instead of traditional wires traveling on the chip surface), significantly increasing the speed of multiprocessor computing systems.

The invention may be used to guide light beams from one chip to another (i.e. from the laser array 50 to the detector array 55), through the spatial control of light beam propagation using a photonic device (configurable spatial light modulator) 52 (individually reconfigurable over the fixed regions 53). At the present time, MQW devices and VCSEL lasers have dimensions on the order of tens of microns in size, well within the range of both practical photonic crystal fabrication and MEMS devices.

Applications for this invention that would benefit from the ability to change the frequency of light passing through the photonic crystal for a specific mode in the photonic band gap are optical filters, that select only a particular frequency from an initial broadband wavelength spectrum, and optical switches, that select certain wavelengths of light that can pass through the photonic crystal as a function of time.

Figure 18:
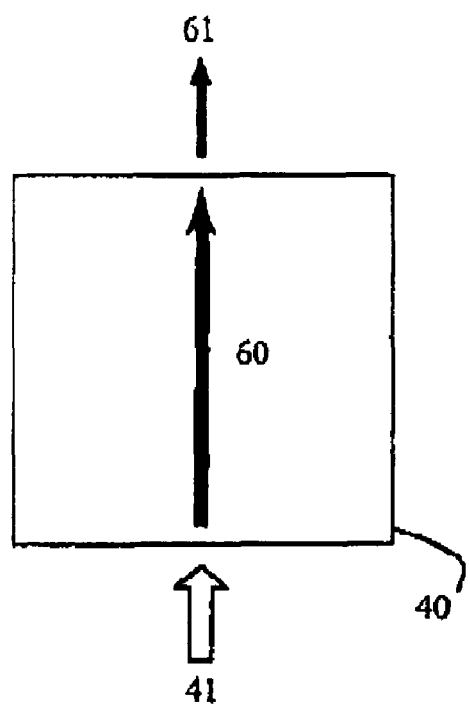
FIG. 18 is schematic representation (plan view) showing an optical filter as an example of an embodiment of the present invention.
Figure 19:
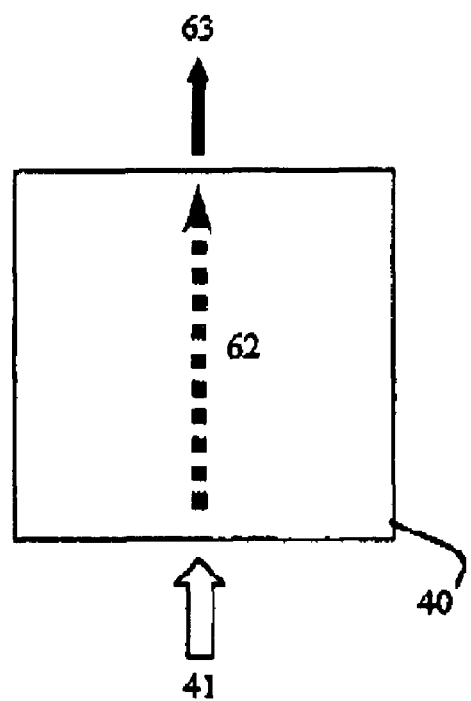
FIG. 19 is schematic representation (plan view) showing an optical switch as an example of an embodiment of the present invention.

FIG. 18 is a plan view schematic representation showing an optical filter as an example of an embodiment of the present invention, The defect state 60 may be configured such that only a selected frequency of the broadband light 41 (with a frequency range within the photonic bandgap) incident on the photonic device 40 will pass through the photonic device 61. FIG. 19 is a plan view schematic representation showing an optical switch as an example of an embodiment of the present invention. The defect state 62 may be configured such that a light mode from the incident broadband light 41 on the photonic device 40 will or will not pass through the photonic crystal 63. In both these modes, the defect state can be altered to permit/disallow a mode passing through the photonic crystal. The switching time is limited by the mechanism of tuning and geometry—commercially available piezoelectric actuators have resonant frequencies in the 1 to 3 kHz range (available from EDO Piezoelectric Products and Ferroperm).

The invention may be used to change both the direction and frequency of light passing through the photonic crystal. Examples of this configuration include a configurable DWDM demultiplexer, a phase modulator, and a configurable channel drop filter.

Figure 20:
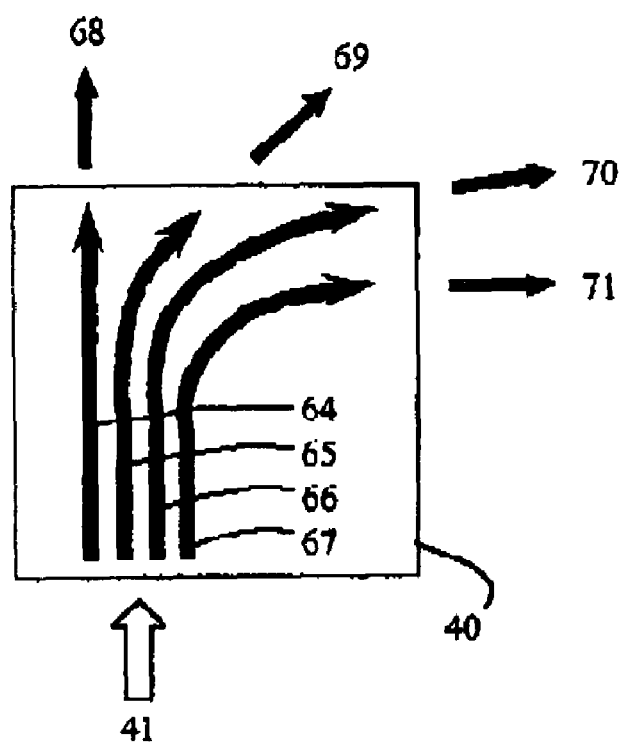
FIG. 20 is schematic representation (plan view) showing a tunable wavelength-division multiplexing/demultiplexing (WDM) system as an example of an embodiment of the present invention.

FIG. 20 shows a photonic device 40 as a configurable DWDM multiplexer. A broadband light input 41, containing a series of different wavelengths 68, 69, 70, and 71, can be "unpacked" by selectively guiding the different wavelengths along specific paths 64, 65, 66, and 67. Any or each of these paths (corresponding to the defect states for a selected wavelength) may be turned on or off and are spatially reconfigurable.

In DWDM systems, the number of wavelength channels that can be transmitted depends on channel spacing, total optical bandwidth of the system, and the modulation bandwidth of the individual optical signals. At present, the common channel spacing for DWDM are 100 GHz (corresponding to a channel spacing of ~0.8 nm at 1550 nm) or lower frequencies (for example, 50 or 25 GHz), providing approximately 50 channels in the C-band (1525 to 1570 nm). These wavelength ranges are well within the range of the feasible unit cell sizes amenable for photonic crystal fabrication.

The invention may also provide a means for tuning of other dispersive photonic crystal components, for example, superprisms (Hideo Kosaka, Takayuki Kawahima, Akihisa Tomita, Masaya Notomi, Toshiaki Tamamura, Takashi Sato and Shojiuo Kawakami, "Superprism Phenomena in Photonic Crystals: Toward Microscale Lightwave Circuits", Journal of Lightwave Technology, Vol. 17, No. 11, 1999, 2032–2038), and ultrarefractive optical elements (S. Enoch, G. Tayeb, and D. Maystre, "Numerical evidence of ultrarefractive optics in photonic crystals", Optics Communications, Vol. 161, 1999, 171–176).

Figure 21:
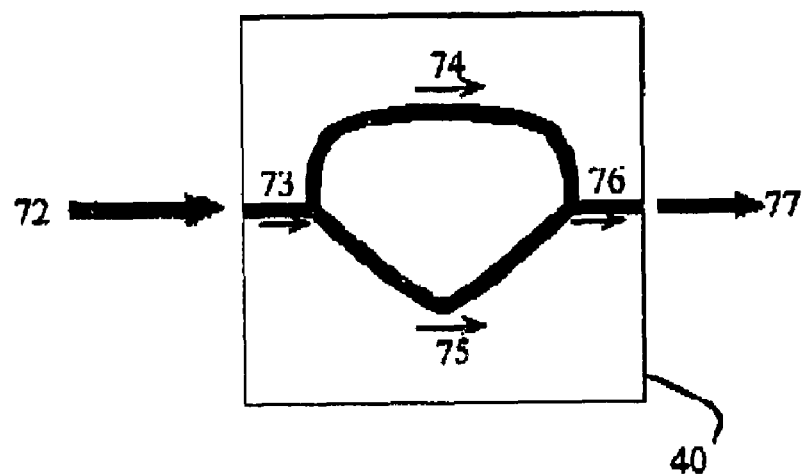
FIG. 21 is schematic representation (plan view) showing a tunable phase modulator as an example of an embodiment of the present invention.

FIG. 21 shows a photonic crystal 40 configured as a tunable phase modulator. The phase of the outgoing light 77 may be modified by causing the incoming beam 73 (selected from a broad band light input 72 incident on the photonic device 40) to be divided into two paths 74 and 75 with different path lengths, recombining in path 76 with the phase depending on the relative path lengths of 74 and 75. By configuring the length of paths 74 and 75 relative to each other, the phase of the output beam 77 will be changed.

Traditionally, electro-optic crystals have been used as phase modulators, but their input and output locations are determined by their fixed waveguides. With the present invention, not only can the phase of the outgoing beam be configured, any number of incoming and outgoing beams can be accommodated with the same device, in a spatially discretionary fashion.

Figure 22:
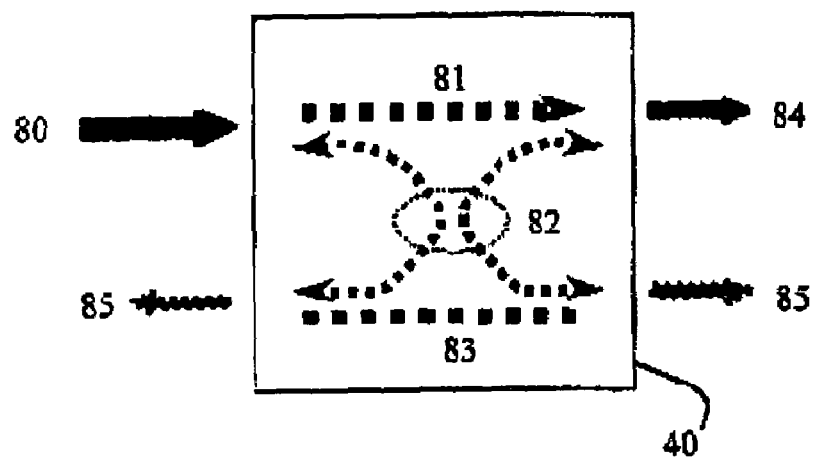
FIG. 22 is schematic representation (plan view) showing a tunable channel drop filter as an example of an embodiment of the present invention.

FIG. 22 shows a photonic device 40 configured as a tunable channel drop filter. In a channel drop filter, a single wavelength channel 85 (e.g., $\lambda_2$) from a multiplexed signal 80 (e.g., $\lambda_1, \ldots \lambda_n$) traveling through a waveguide 81 can be transferred into a second waveguide 83 using an optical resonator system 82 without disturbing the other channels (i.e., channels $\lambda_1, \lambda_3, \ldots \lambda_n$ will continue along waveguide 81 undisturbed).

Fixed optical resonator systems in 2D photonic crystals have been investigated using different sized cavities (or defect modes) to transfer a single wavelength channel from waveguide 81 to 83 (Shanhui Fan, P. R. Villeneuve, J. D. Joannopoulos, and H. A. Haus, "Channel drop filters in photonic crystals", Optics Express, Vol. 3, No. 1, Jul. 6, 1998, 4–11). With the present invention, there is the added benefit of mechanically configuring the defect mode such that a range of wavelengths (instead of a single wavelength) may be accessed and a range of directions (and exit locations) of the dropped channel may be reconfigured.

The invention can also provide a means for controlling the magnitude of the non-linear response of a photonic crystal. For example, a photonic crystal may be comprised of element(s) exhibiting non-linear optical response(s). These response(s) may be tuned by adjusting the relative location(s) of these elements with respect to each other.

The configurable photonic device of the present invention may also be used to optimize desired photonic crystal-based devices through optical feedback. This capability may occur through tuning of the individual configurable cells/elements based on feedback from a detection system (for one or more channels) and analysis based on the value of said output(s). In this way, the desired output may be optimized continually with little user intervention, correcting for aging or degradation in device performance through such self-adaptive fine-tuning of the structure with time.

Figure 23:
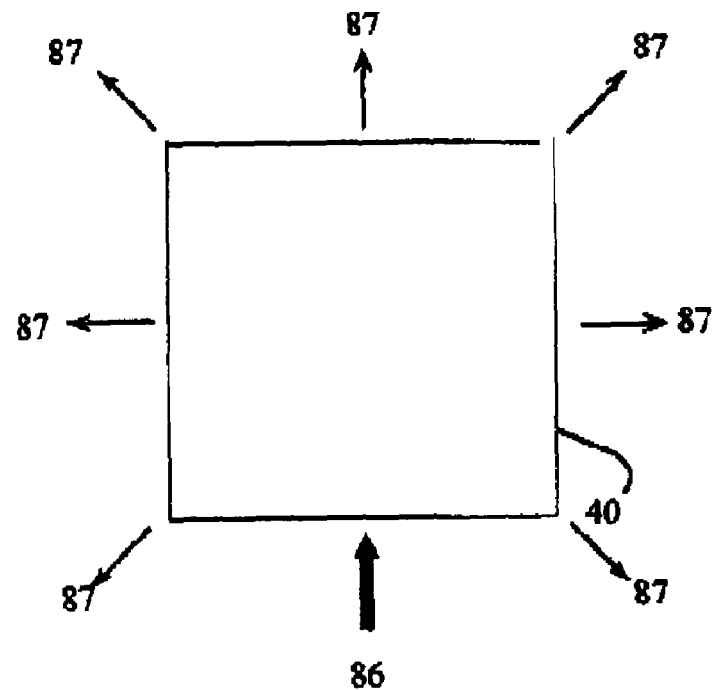
FIG. 23 is schematic representation (plan view) showing a real, imperfect photonic crystal structure.
Figure 24:
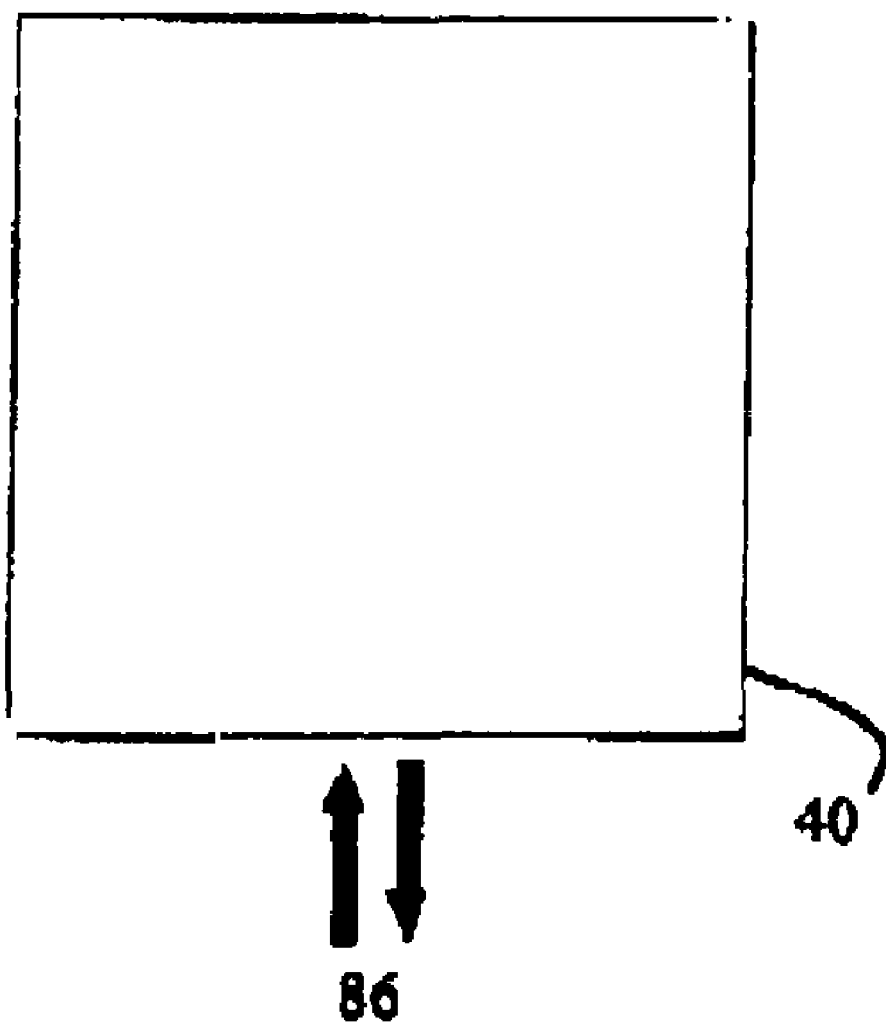
FIG. 24 is schematic representation (plan view) showing a compensated imperfect photonic crystal structure of the present invention.

Another application of the invention is to compensate an imperfect real structure, FIG. 23 shows an imperfect (i.e. "real") photonic crystal 40 in which the incident broadband light 86 is not completely reflected by the photonic crystal 87 due to imperfections (or defect states) in the photonic crystal. FIG. 24 shows a compensated photonic device in which the incident broadband light 86 (lying within the photonic bandgap) is substantially totally reflected by the photonic crystal.

It will of course be appreciated by those skilled in the art that many variations are possible within the broad scope of the invention. The invention may be utilized as a basis for designing other structures, devices and circuits for carrying out the objects of the invention. The disclosure is intended to be read by way of illustration only, and the scope of the invention is to be measured by the claims that follow.

We claim:

1. A photonic device comprising a photonic crystal capable of permitting the propagation or confinement of light through defect states therein, said photonic crystal having configuring means for effecting a local change to the physical geometry in at least one region of said photonic crystal such that the propagation of light therethrough or the confinement of light therein is thereby altered.

2. The photonic device of claim 1, wherein said configuring means includes an electrostrictive component of said photonic crystal.

3. The photonic device of claim 1, wherein said configuring means includes a piezoelectric component of said photonic crystal.

4. The photonic device of claim 1, wherein said configuring means includes a magnetostrictive component of said photonic crystal.

5. The photonic device of claim 1, wherein said configuring means includes an actuation device affixed to said photonic crystal.

6. A photonic device as recited in one of claims 1 to 5, wherein said configuring means provides at least one change in the respective direction of propagation of one or more beams of light of fixed frequency.

7. A photonic device as recited in one of claims 1 to 5, wherein said configuring means provides at least one change in the respective electromagnetic field pattern of one or more modes of confined light.

8. A photonic device as recited in one of claims 1 to 5, wherein said configuring means provides at least one change in the respective frequency of one or more beams of light propagating through said device.

9. A photonic device as recited in one of claims 1 to 5, wherein said configuring means provides at least one change in the respective frequency of one or more modes of light confined in said device.

10. A photonic device as recited in one of claims 1 to 5, wherein said configuring means provides at least one change in each of the respective direction and frequency of one or more beams of light propagating through said device.

11. A photonic device as recited in one of claims 1 to 5, wherein said configuring means provides at least one change in each of in the respective electromagnetic field pattern and frequency of one or more modes of light confined in said device.

12. A photonic device as recited in one of claims 1 to 5, wherein said configuring means provides at least one change in each of the respective spatio-temporal electric and magnetic field intensities associated with one or more beams of light propagating through said device, or confined therein.

13. A photonic device as recited in one of claims 1 to 5, wherein said configuring means provides one or more changes in the respective direction, frequency, electric and magnetic field intensity, or combinations thereof, associated with one or more beams of light propagating through said device as a function of time.

14. A photonic device as recited in one of claims 1 to 5, wherein said configuring means provides one or more changes in the respective electromagnetic field pattern, frequency, electric and magnetic field intensity, or combinations thereof, associated with one or more modes of light confined within said device as a function of time.

15. A photonic device as recited in one of claims 1 to 5, wherein said configuring means provides at least one change in the symmetry of one or more modes of light confined in said device, or propagating therethrough.

16. A photonic device as recited in one of claims 1 to 5, wherein said configuring means comprises at least one measured output signal to said device and at least one applied input signal to change the physical geometry of said device, so as to provide for either closed loop control or open loop control.

17. A photonic crystal for use in a photonic device, said photonic crystal having defect states permitting the propagation of light therethrough or the confinement of light therein, and comprising configuring means for effecting a local change to the physical geometry in at least one region of said photonic crystal such that the propagation of light therethrough or the confinement of light therein is thereby altered.

18. The photonic crystal of claim 17, wherein said configuring means includes an electrostrictive component of said photonic crystal.

19. The photonic crystal of claim 17, wherein said configuring means includes a piezoelectric component of said photonic crystal.

20. The photonic crystal of claim 17, wherein said configuring means includes a magnetostrictive component of said photonic crystal.

21. The photonic crystal of claim 17, wherein said configuring means includes an actuation device affixed to said photonic crystal.

22. A photonic device comprising a photonic crystal with at least one element that exhibits a non-linear optical response, having configuring means for effecting a change to the physical geometry in at least one region of said photonic crystal such that the propagation of light therethrough or the confinement of light therein is thereby altered, wherein said configuring means provides at least one change in the non-linear response in said device, for light propagating therethrough or confined therein.

23. A photonic device comprising a photonic crystal having configuring means for effecting a change to the physical geometry in at least one region of said photonic crystal such that the propagation of light therethrough or the confinement of light therein is thereby altered, wherein said configuring means is adaptive for configuration in part or in whole of said device, and includes compensation for imperfections in the photonic crystal structure of said photonic crystal.

24. The photonic device of claim 22 or 23, wherein said configuring means includes an electrostrictive component of said photonic crystal.

25. The photonic device of claim 22 or 23, wherein said configuring means includes a piezoelectric component of said photonic crystal.

26. The photonic device of claim 22 or 23, wherein said configuring means includes a magnetostrictive component of said photonic crystal.

27. The photonic device of claim 22 or 23, wherein said configuring means includes an actuation device affixed to said photonic crystal.

\* \* \* \* \*